Figure 1:
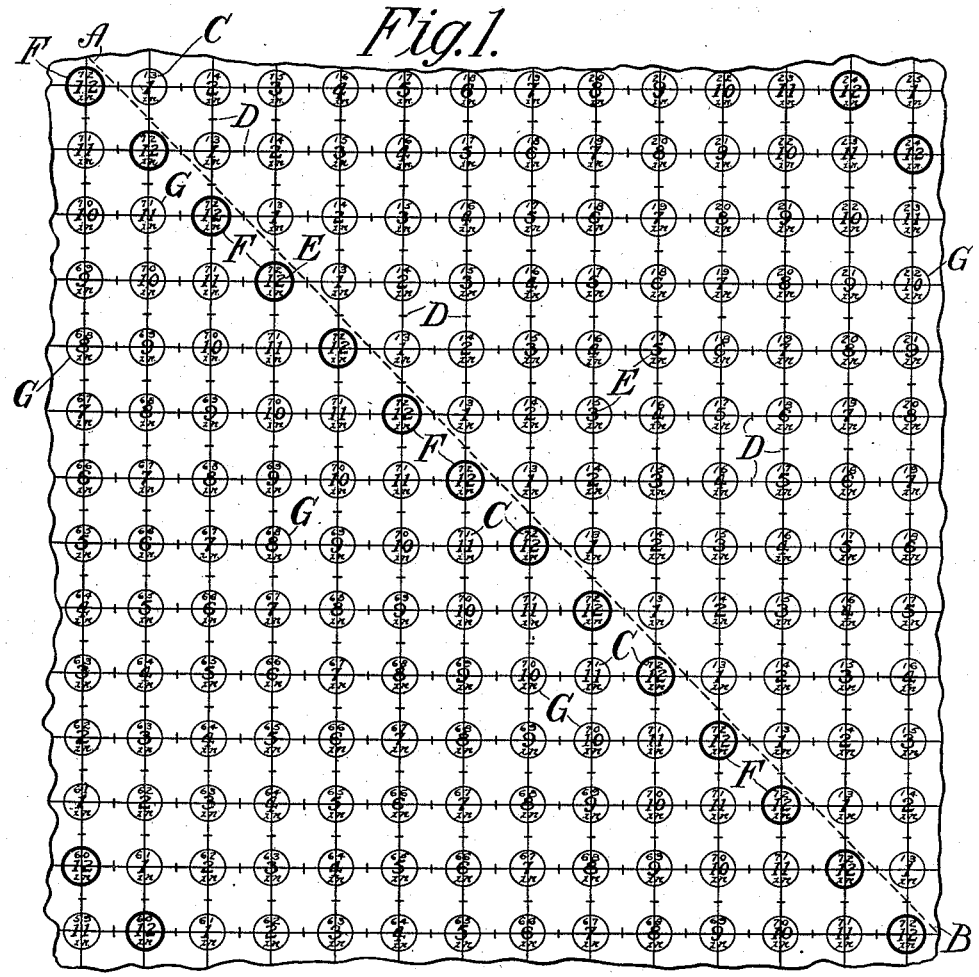

W. H. PUTNAM & M. C. READY.
WRAPPING MATERIAL AND CONTAINER.
APPLICATION FILED JAN. 2, 1913.

1,116,918.

Patented Nov. 10, 1914.

WITNESSES:
U. T. Grise
J. D. Long

INVENTORS
W. H. Putnam
M. C. Ready
BY
ATTORNEY.

UNITED STATES PATENT OFFICE.

WILLIAM H. PUTNAM AND MARTIN C. READY, OF NEW YORK, N. Y.

WRAPPING MATERIAL AND CONTAINER.

1,116,918.  Specification of Letters Patent.  Patented Nov. 10, 1914.

Application filed January 2, 1913. Serial No. 739,600.

*To all whom it may concern:*

Be it known that we, WILLIAM H. PUTNAM and MARTIN C. READY, citizens of the United States of America, and residents of New York city, in the county of New York and State of New York, have invented certain new and useful Improvements in Wrapping Materials and Containers, of which the following is a full, clear, and exact description.

This invention relates to a device to facilitate the rapid handling of all parcels, bundles, boxes, etc., subject to the process of wrapping or containing, either in paper, boxes, cartons, cloth, box board, corrugated board, etc., for all methods of shipping and forwarding, including the parcels post, and has for its object the provision of an accurate computing, continuous or repeating scale, suitably divided to show the inches and such fractions thereof as may be required, and readable lengthwise and crosswise as well as girthwise, the limit of scale measurements being governed only by the length of the inclosing material itself, whether it be of box, tubular or other shape, or whether it come in individual sheets or in the form of continuous material such as paper or cloth fed from a roll. In the case of a roll of paper the graduations are repeated in continuous segments of twelve inch lengths, ended to each other, and adjacent in parallel columns, either lengthwise or crosswise of the material, or both. In the case of a pasteboard box to be shipped without wrapping, the graduations would be applied to the material before it was converted into box shape, or it could be wrapped in graduated paper and tied, or graduated pasters adhered to the length and breadth. In any instance it is immaterial where the graduations begin to be visible on the parcel as the graduations conform in their repeated form to a continuous or multiplex scale, and are bound to exhibit a zero starting point from which computing of the length or girth of a parcel becomes an easy and rapid operation, doing away with the necessity of operating a tape measure, or measuring instrument.

In the instance of the parcels post, the regulations of which require that all parcels below a given maximum of weight shall be mailed in a parcel not exceeding a certain specified and combined length and girth inch measurement, such a device assumes special importance, as it enables the shipper to measure the dimensions of his parcels as he wraps them from the form, construction and design of the wrapping material itself, thus eliminating the measuring by other means that would be necessary but now becomes obsolete. Thus by permanently affixing an outside skin to wrapping materials and containers which furnishes the means to accurately secure the dimensions of the parcel, an advantage accrues to the postal department through the fact that postal employees, by having the measuring means affixed to the parcel when it comes into the care of the department, may also instantaneously check up the dimensions of a parcel without any other process than glancing at the graduations already a part of the wrapper or container.

Wrapping materials may have the computing, repeating or continuous scale affixed either by printing, embossing, waterlining, perforating or by chemical and other recognized means that will produce results sufficiently accurate to fulfil the purpose. Metal boxes and containers may be graduated with a tool or chemically, or may receive its scale either by printing, transferring or other reliable means. An irregularly shaped bundle, by means of this device, may have its dimensions checked up every inch of its length and girth. Wrapping materials, fed from a roll, or in sheet form, may carry the graduations on both sides, making either side equally convenient for use. That a shipper complies with the postal regulations affecting parcels can readily be ascertained if, when the parcel is wrapped and tied, he runs his eye along the length and makes note of it mentally and then adds the girth dimension as given by the graduations.

The scale may be affixed not only lengthwise and crosswise of the material but as well diagonally, which permits the shipper to secure a longitudinal and girth dimension in the case of a mailing tube or blue print that has been wrapped in a narrow sheet torn from a roll and ribboned on from one corner of the tube.

The invention is described in conjunction with the accompanying drawings and is set forth in the claims.

In the drawings:—Figure 1 is a diagrammatic view showing the surface of a sheet of wrapping paper in section, said surface being divided up into squares of one inch dimension to the side, the intersection on each corner of a square being marked by a circle G, inside of which is the numeral E, marking an inch as it falls in its consecutive order in its own individual column. The zero point at the beginning of each twelve inch length is marked by the figure 12 of each preceding twelve inch length, and that this point may be more clearly apparent than the lighter circles surrounding the other numerals, it is therefore surrounded by a heavy ring, F, in contradistinction to the light circles, G. Half inch subdivisions are indicated by D, which in turn may be subdivded as far as practice demands. In the instance of extra long parcels, requiring added mental calculation, there may be inserted above the figures E in each circle G the augmented measurement accruing over and above the 12 inch lengths specified by extending the number of inches over and above 12 and indicating the same in small figures as at C, which is continued in the instance of long rolls up to lengths of 72 inches, but which may be shortened to lengths of 24, 36 and 48 inches, thence repeating.

Figure 2:
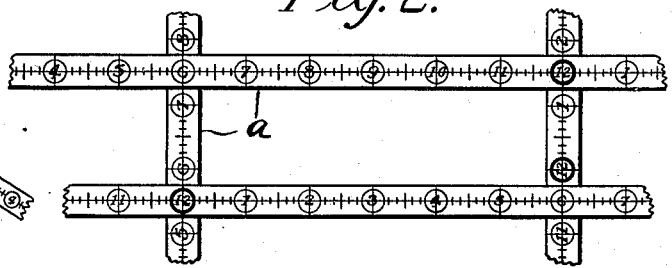

An approximate system may be followed by superimposing on the wrapping materials graduated paper or cloth tapes, utilizing substantially the same arrangement as set forth in Fig. 1, or of using one tape singly, or plural tapes $a$ which may be disposed of at certain predetermined distances apart, as indicated in Fig. 2, such tapes to be either pressed into the material or gummed thereon, the latter operation involving slightly more work than measuring with a tape, while tendering to the postal authorities a considerable convenience in handling the parcel.

Figure 3:
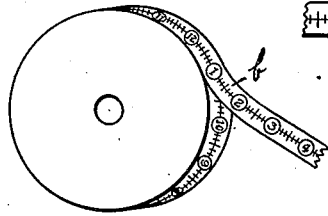

Fig. 3 shows a gummed tape $b$, a strip of which may be pasted to a parcel to indicate a permanent record of its original measurement, both length or girth and the good faith of the shipper in keeping within the government ruling.

In Fig. 1 the line A, B, on the left indicates the termination of the 72-inch numerical extension, at which point and to the right of the line A, B, a new set of numerals comes into effect. The diagonal strip of heavy circles show the end of the 12 inch scale in each instance. However, the smaller numerals within the circles to the right of the line A, B, begin with the figure 13, which indicates that for purposes of condensation in the drawing that a set of numerals 12 inches in all, have been eliminated, else for a stretch of 12 inches to the right of the line A, B, there would have been no augmented numerals within the circles G.

Figure 4:

As represented in Fig. 4, cord $c$ having length divisions thereof $d$ suitably designated may be employed for facilitating the ascertainment of length and girth dimensions of a package.

By offsetting each 12 inch length, as shown in Fig. 1, both the length and girth of the parcel is bound to exhibit a zero point by which the computation of the dimensions starts; and in any instance the shipper or postal employee has a fixed scale to work from, which he is certain to memorize and figure from regardless of the zero points.

We claim:—

1. A wrapping material having a set of lengthwise inch-divided scales in parallelism with each other and a set of similar transverse scales in parallelism with each other and at right angles to the first mentioned scales, the inch divisions of the scales being so numbered that any number on any one of the scales will lie opposite the next higher number of the next adjacent scale above in the first mentioned set and to the right in the other set.

2. A package wrapper having thereon a set of lengthwise scales in parallelism with each other and divided into units of length, each of such units being divided into consecutively numbered fractions thereof, and a set of similarly-divided scales in parallelism with each other arranged in angular relation to the lengthwise scales, the fractional division mark at the left-hand end of each lengthwise scale and at the top of each angular scale being indicated by a number which is one unit lower than that of the division mark at the left-hand end of the lengthwise scale next above, and at the top of the next angular scale to the right, respectively.

3. A package wrapper having thereon a set of lengthwise scales in parallelism with each other and divided into units of length and each unit into consecutively numbered fractions of a unit of length, and a set of similarly divided scales in parallelism with each other and at right-angles to the first mentioned scales, the fractional divisions of the scales being so numbered that any number on any one of the scales will lie opposite the next higher number of the next adjacent scale above in the first mentioned set and to the right in the other set, each fractional division of each scale in the said first mentioned set also bearing a supplemental number which is cumulative of the number of fractional divisions in that scale, up to that particular division starting from the one at the left of that scale, any part of a unit counting as a whole.

Signed by us at New York city in presence of two subscribing witnesses.

WILLIAM H. PUTNAM.
MARTIN C. READY.

Witnesses:
FRANK HAMMOND,
R. A. BAKER.